United States Patent [19]
Ellis et al.

[11] 3,862,545
[45] Jan. 28, 1975

[54] GEOTHERMAL BRINE ENERGY TO GENERATE POWER

[75] Inventors: John R. B. Ellis, Kentfield; Arthur W. Pryor, El Cerrito, both of Calif.

[73] Assignee: Chevron Research Company, San Francisco, Calif.

[22] Filed: Apr. 25, 1974

[21] Appl. No.: 464,275

Related U.S. Application Data
[63] Continuation of Ser. No. 296,371, Oct. 24, 1972, abandoned.

[52] U.S. Cl. .................................... 60/641
[51] Int. Cl. ..................... F03g 7/04, F03g 7/02
[58] Field of Search ........................................ 60/641

[56] References Cited
UNITED STATES PATENTS
3,470,943  10/1969  Van Huisen ...................... 60 X/641
3,605,403  9/1971  Aikawa et al. ..................... 60/641
3,640,336  2/1972  Dixon ............................. 60 UX/641

Primary Examiner—Martin P. Schwadron
Assistant Examiner—Harold Burks, Sr.
Attorney, Agent, or Firm—G. F. Magdeburger; R. H. Davies; J. J. De Young

[57] ABSTRACT

A process for using energy from a hot brine to generate power, comprising:
  flashing the hot brine in a flash zone to form steam and a concentrated brine,
  using the steam to drive a power-generating turbine,
  condensing the exhaust steam from the turbine,
  combining condensate from the turbine exhaust with the concentrated brine to form a restored brine,
  and returning the restored brine to the source of the hot brine.

9 Claims, 1 Drawing Figure

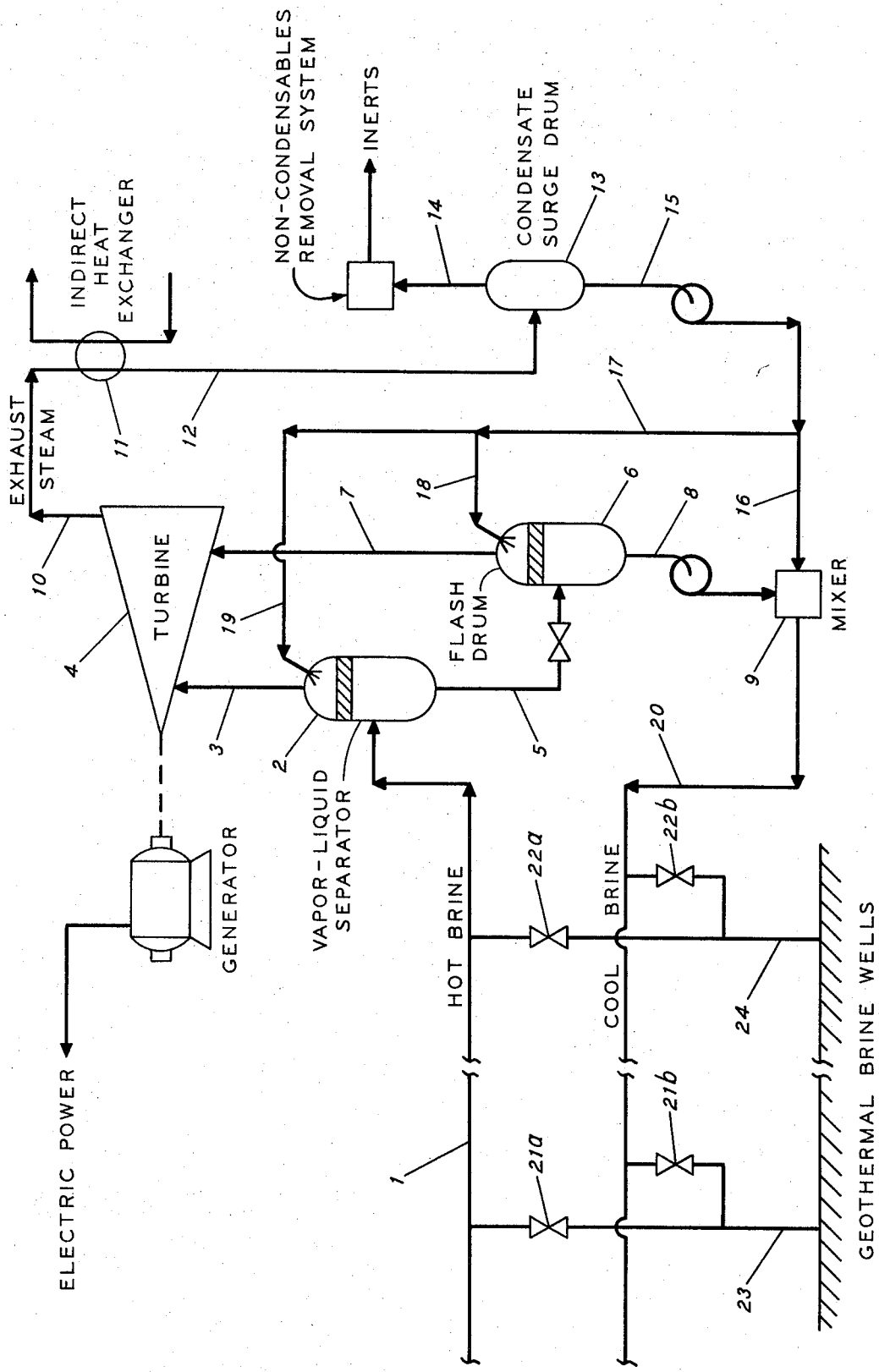

3,862,545

GEOTHERMAL BRINE ENERGY TO GENERATE POWER

This is a continuation of application Ser. No. 296,371 filed Oct. 24, 1972, now abandoned.

BACKGROUND OF THE INVENTION

Field of the Invention a. General

The present invention relates to recovery and utilization of geothermal energy.

The continuing energy crisis, which is growing worse, affects the United States and the entire world. The discovery of new crude oil fields has, to a large extent, failed to keep up with increasing demand for new energy sources. Sources of geothermal energy have been receiving increased attention. Power may be generated by using energy from hot geothermal brines to drive steam turbines.

b. Problems Involved in Recovery and Utilization of Geothermal Brines

In many places, particularly in California's Imperial Valley, these hot geothermal brines have dissolved therein significant quantities of various soluble salts, including sodium and potassium chloride, calcium salts and iron and manganese salts. Steam from these geothermal brines may also contain these dissolved salts, and when the steam is used to drive turbines, these salts have a strongly corrosive action on the turbine blades and accessory equipment, particularly in the presence of air. Further, small quantities of other materials such as silica and ferrous compounds are often present in the brines. The silica as well as other components may, as the concentration increases as stream is flashed, precipitate in the piping system, forming scale deposits. This scale, if not removed, ultimately can lead to shutdown of the system. The ferrous compounds, if they come in contact with air (oxygen), oxidize to ferric salts with the concomitant formation of hydrochloric acid. Corrosion becomes a very real problem.

Additionally, increasing concern with the environment has caused the presence of the soluble salts to restrict the disposal of the geothermal brines and components thereof.

The present invention is directed to a process whereby the energy from geothermal brines can be recovered while minimizing the deleterious effects on the environment and process equipment of the salts dissolved in said brines.

SUMMARY OF THE INVENTION

The present invention is directed to a process for using energy from hot brine to generate power, comprising:

1. flashing the hot brine in a flash zone to form steam and a concentrated brine;
2. using the said steam to drive a power-generating turbine;
3. condensing the exhaust steam from the turbine;
4. combining the turbine exhaust with said concentrated brine and
5. returning the restored brine to the source of the hot brine.

Preferably air (oxygen) is excluded from the system to minimize corrosion. Said flash zone preferably comprises at least one flash drum. Preferably at least some of the flashing of the hot brine is carried out in said flash drum and a portion of the condensate is recycled to said flash drum. Preferably the hot brine is flashed without any substantial crystallization of the soluble salts.

DETAILED DESCRIPTION OF THE INVENTION

Drawing

The drawing is a diagrammatic illustration of apparatus and flow paths suitable for carrying out one embodiment of the process of the present invention.

STATEMENT OF THE INVENTION

In accordance with the present invention there is provided a process for using energy from a hot brine to generate power, comprising:

1. flashing the hot brine in a flash zone to form steam and a concentrated brine, preferably without any substantial crystallizing of dissolved salts;
2. using the said steam to drive a power-generating turbine;
3. condensing the exhaust steam from the turbine;
4. combining at least the major portion of the turbine exhaust with the concentrated brine to form a restored brine; and
5. returning the restored brine to the source of the hot brine.

Preferably air (oxygen) is excluded from the system to minimize corrosion. Additionally, at least a portion of the flashing of the hot brine is preferably carried out in at least one flash drum, and a portion of the condensate is recycled to the flash drum.

Process Operation with Reference to Drawing

Referring now to the drawing, in a preferred embodiment of the present invention, hot brine which already has partially flashed is fed via line 1 to vapor-liquid separator 2. It should be noted that while the vessel denoted as 2 is referred to herein as a separator, some flashing may occur therein as well. In separator 2 the hot brine and steam are separated, with the steam passing overhead via line 3 to power-generating turbine 4. The concentrated brine is passed via line 5 to flash drum 6, operating at a lower pressure and temperature. Steam generated in flash drum 6 is passed via line 7 to power-generating turbine 4 and introduced into the turbine at an appropriate location. The concentrated brine is then passed via line 8 to mixer 9. Exhaust steam from turbine 4 is passed via line 10 to indirect heat exchange zone 11, and then via line 12 to condensate surge drum 13, from which any noncondensables originally present in the brine (e.g., $H_2S$ and $CO_2$) are removed by line 14. The condensate is then sent via lines 15 and 16 to mixer 9. A portion of the condensate can be recirculated via lines 17, 18 and 19, as desired, to prevent solids formation in separator 2 and flash drum 6. Additionally, by recirculating condensate to separator 2 and flash drum 6, the demisters in the vessels (denoted by cross-hatching) can be continuously wet down to prevent solids entrainment (if salts precipitate) in the steam going to the turbine. After mixing in mixer 9, the cooled, restored brine having the approximate composition of the hot brine is returned to the geothermal brine well via line 20. As shown by valve system 21a, 21b, 22a, and 22b, a minimum of two geothermal brine wells is desirable in the subject process for continuous operation. As shown in power-generating drawing, valve 21a is open, allowing hot brine to flow through line 23 to hot brine line 1. Valve 21b is closed, preventing the restored, cool brine from entering line 23. Valve 22a is closed and valve 22b is open, allowing the restored, cool brine to be returned to the geothermal brine well by line 24. It is to be understood that by the language "returning the restored brine to the source of the hot brine" is meant the restored brine is returned to the formation from which the hot brine was obtained. It is not meant that the restored brine is necessarily returned to the formation through the same well from which it was obtained. This can be done, but requires a non-continuous operation.

The cycling effect utilized in lines 23 and 24 also serves to reduce plugging due to solids deposited by flashing liquids during production. Similarly, the recirculation of condensate to separator 2 and flash drum 6 (as well as preventing solids entrainment) serves to reduce scale deposits in the vessels.

As can be seen from the drawing, the present process provides an efficient method for utilizing the energy present in hot brine. In order to avoid solids formation in the lines, heating by external means and/or insulation of lines 1, 5, 8, 20, 23 and 24, i.e., all lines where the brine is carried, may be desirable. Means for heating these lines may include steam jacketing, steam tracing, electrically heating, etc. Additionally, flashing of the hot brine is carried out at temperatures and pressures to avoid any substantial amount of crystallization of soluble salts in the system.

The system is preferably operated as a closed system with the exclusion of air to minimize corrosion. By preventing air (specifically, oxygen) from entering the system to any significant extent, the corrosion resulting from the dissolved salts can be reduced, as discussed above under "Field of the Invention."

Preferably the entire turbine exhaust is combined with the concentrated brine. However, where appropriate, a portion may be drawn off and used for irrigation or the like.

Process Conditions

The following process conditions are not to be construed as limiting, but simply as exemplary of typical conditions which may be encountered at the wellhead and used in the process scheme.

Typically, the brine has partially flashed when it reaches the surface (wellhead) and is at a temperature of about 435° F and a pressure of about 300 psig. The vapor-liquid separator may be operated (depending on dissolved salt composition and solubility) at a pressure of about 250 psig and a temperature of about 420° F. The flash drum typically may be operated at a pressure of 50 psig and a temperature of about 315° F.

It is apparent that many widely different embodiments of this invention may be made without departing from the scope and spirit thereof; and, therefore, it is not intended to be limited except as indicated in the appended claims.

What is claimed is:

1. A process for using energy from hot brine to generate power, comprising:
   1. flashing said hot brine in a flash zone to form steam and a concentrated brine;
   2. using said steam to drive a power-generating turbine;
   3. condensing the exhaust steam from said turbine;
   4. combining at least the major portion of the condensed turbine exhaust with said concentrated brine to form a restored brine having a composition approximating that of said hot brine; and
   5. returning said restored brine to the source of said hot brine.

2. The process of claim 1 wherein said process is carried out with the substantial exclusion of air from the system.

3. The process of claim 1 wherein said flashing is carried out without any substantial crystallization of the soluble salts.

4. The process of claim 3 wherein at least a portion of said condensate is recycled to said flash zone.

5. The process of claim 1 wherein said hot brine is obtained from said source by at least one brine well and said restored brine is returned to said source via a second brine well.

6. The process of claim 5 wherein said process is carried out with the substantial exclusion of air from the system.

7. The process of claim 1 wherein lines carrying brine are insulated.

8. The process of Claim 1 wherein lines carrying brine are heated.

9. The process of claim 1 wherein lines carrying brine are heated and insulated.

* * * * *